Figure 1:
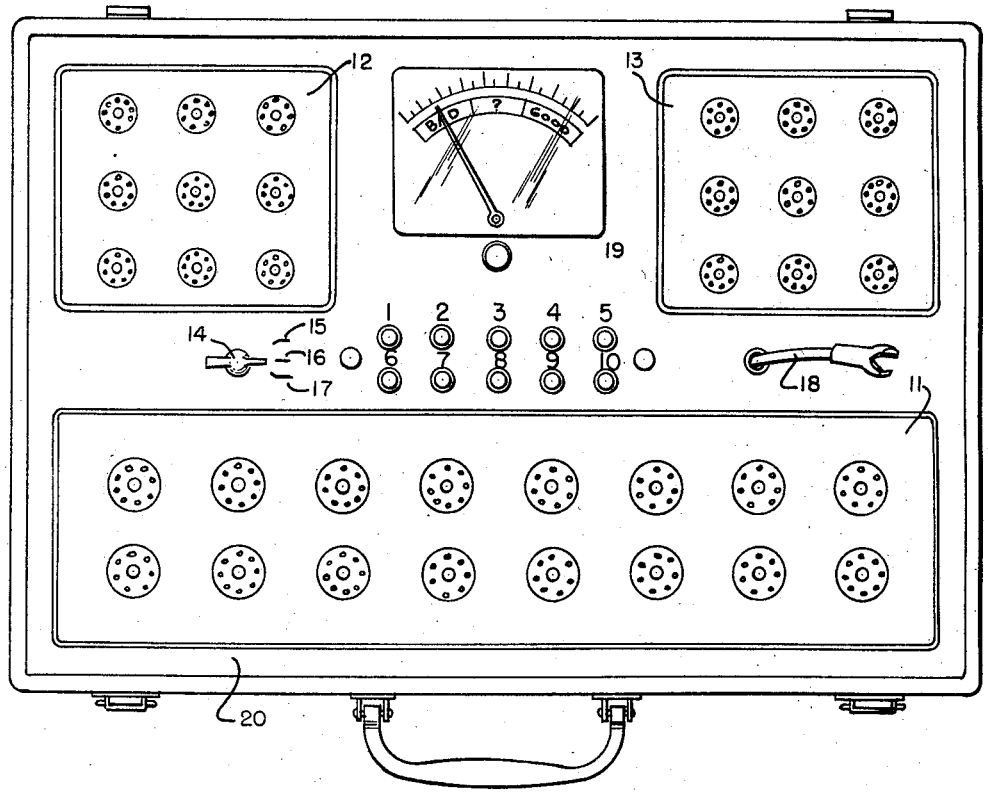

July 28, 1959  J. ANTHES  2,897,434
TUBE TESTER
Filed June 27, 1957  2 Sheets-Sheet 1

INVENTOR
Jacob Anthes
BY
ATTORNEYS

July 28, 1959

J. ANTHES 2,897,434

TUBE TESTER

Filed June 27, 1957

2 Sheets-Sheet 2

INVENTOR
Jacob Anthes
BY
Moore & Hall
ATTORNEYS

United States Patent Office 2,897,434
Patented July 28, 1959

2,897,434

TUBE TESTER

Jacob Anthes, Fort Atkinson, Wis.

Application June 27, 1957, Serial No. 668,466

15 Claims. (Cl. 324—23)

The present invention relates to improved tester devices such as may be employed in the testing of vacuum tubes; and is more particularly concerned with a tester adapted to perform a rapid and accurate test of tube worth as well as of gas and interelectrode leakage and shorts.

As is well known at the present time, it is highly desirable to perform tests on vacuum tubes, such as those employed in conventional television receivers, to determine their operability and to discover possible faulty components in an electronic circuit. For the most part, tube testers of the types employed heretofore have been of the so-called dynamic type, in that the tests have been performed by subjecting the several electrodes of a tube under test to rated potentials, whereby the tube being tested is actually caused to operate as theoretically intended when incorporated in a more complex electronic circuit.

In particular, such prior testers ordinarily measure tube worth in terms of cathode emission or tube transconductance. These tests accordingly require that the tube draw a substantial plate current during the test to actuate appropriate indicating means such as a tester meter. This particular characteristic, i.e. the drawing of appreciable plate current, imposes a number of further requirements in the tester circuit design. First, a substantial plate voltage is necessary, and in order that tests on different tubes can be conducted, it is further required that this plate voltage be variable in nature. Second, due to the great differences in emission between various tube types, some form of widely variable load control has been required. Third, the plate circuit of the tube tester has of necessity been of low impedance in order to permit the appreciable plate current, produced during the tube test, to flow; and, in order to permit meter indications of the widely varying plate current produced during the testing of various different tubes, some means such as fixed load resistors coupled to the socket of the tube being tested, have been required to establish different meter ranges for various tubes under test.

By the very nature of dynamic testers employed heretofore, as described above, the overall configuration of tube testers known heretofore has been complex; and has required that fairly elaborate setup procedures be followed to assure that the several electrodes of the tube under test are supplied with rated potentials at appropriate loads to operate as intended under dynamic conditions. However, notwithstanding the foregoing complexity, presently known tube testers often give inaccurate test indications, for as a practical matter, and as will be discussed subsequently, the use of rated potentials in tube testing often gives a completely fallacious test result, particularly in the case of the testing of so-called series string tubes such as may be employed in television receivers.

The present invention serves to obviate the foregoing difficulties and is particularly concerned with an improved tube tester of simple and inexpensive design, which is adapted to give an extremely rapid test serving to detect those faults which are most likely to occur in vacuum tubes. In this respect it should be noted that, as is well known, those faults which occur with by far the greatest frequency in vacuum tubes, are: (a) faulty cathode emission due to insufficient cathode coating or to other cathode defects; (b) gas and interelectrode leakages; and (c) cathode-to-heater short-circuits. The present invention comprises a tube tester which is capable of readily detecting each of these faults; and in performing its function, the tube tester of the present invention is particularly characterized by a much more simple and efficient structure than has been possible heretofore.

In particular, the tester of the present invention eliminates all filament switches and filament setups; employs an extremely high impedance load thereby eliminating all necessity for load control settings; tests all tubes, large or small, on the same meter range thereby obviating the necessity of providing switches and meter shunts for changing meter range; tests for tube worth, gas current and inter-element leakage, and short-circuits, all on the same meter, thereby eliminating various auxiliary indicators such as neon lamps which were necessary heretofore; provides for leakage and gas tests which have a sensitivity surpassing that of any commercial tester known heretofore; and performs the desired tests at a very low test voltage (not over two volts) thereby eliminating the necessity of electrode voltage setups and the variable voltage sources considered necessary for such setups heretofore. Indeed, as will be described subsequently, the tube tester of the present invention performs a worth test as an initial velocity test which has proved extremely accurate; and by reason of the nature of this test, the potential only of an element of a tube under test determines the test meter reading, whereby no plate current need be drawn through the tube under test during the testing thereof. Since no plate current is drawn, the size of the tested tube elements becomes immaterial, and a small tube such as a 1R5 reads just as high as the most powerful tube being tested, whereby the tester automatically gives an accurate indication of tube worth, which indication is unaffected by an artificial set of voltages and conditions imposed by the tube tester circuit.

It is accordingly an object of the present invention to provide an improved tube tester which is simpler and more inexpensive to construct and maintain than has been possible with testers suggested heretofore.

Another object of the present invention resides in the provision of a tube tester adapted to perform tests serving to detect those faults most likely to occur in known vacuum tubes; and in particular, adapted to perform reliable tests serving to catch faulty cathode emissions, gas and interelectrode leakages, and cathode-to-heater short-circuits.

A further object of the present invention resides in the provision of a tube tester having a leakage and gas test sensitivity which surpasses that of commercial testers known heretofore.

A still further object of the present invention resides in the provision of a tube tester comprising a plurality of test sockets so wired to sources of supply and to test switches that selection of an appropriate socket for test purposes automatically affords a preliminary setup of the test circuit.

Still another object of the present invention resides in the provision of a tube tester which is extremely simple in construction and which is adapted to test any of many known vacuum tubes in an extremely simple manner; and in particular, the present invention is adapted to perform the aforementioned simple but reliable test through the depression of one and no more than two push buttons.

A still further object of the present invention resides in the provision of an improved tube tester which is adapted to perform tube worth tests by determining the contact potential developed on a tube electrode, due to electrons impinging on said electrode, whereby said tube worth test obviates the necessity of dynamic test operation with the attendant complexity of test setup characteristic of testers suggested heretofore.

Still another object of the present invention resides in the provision of an improved tube tester adapted to test series string tubes in a more reliable manner than has been possible heretofore; and in this respect the present invention is particularly designed to test such series string tubes at a rated heater current rather than at a rated heater voltage, whereby the test performed by the present invention simulates the actual operation of such series string tubes in a more complex electronic apparatus.

Still another object of the present invention resides in the provision of an improved tube tester wherein all load control is eliminated; and in particular, the present invention provides a tube tester employing an extremely high impedance test circuit in conjunction with an extremely low test voltage, whereby it is possible to test all tubes, regardless of size, on the same meter without the necessity of changes in meter range.

Still another object of the present invention resides in the provision of an improved tube tester which is adapted to indicate cathode emission, gas and interelectrode leakages, and interelectrode shorts on a common meter thereby obviating the necessity of auxiliary indicators required heretofore.

A further object of the present invention resides in the provision of an extremely simple but reliable tube tester which requires little if any test setup, and which permits an extremely simple test procedure thereby permitting tests to be performed by persons relatively unskilled in the electronic arts.

In providing for the foregoing objects and advantages, the present invention contemplates the provision of an improved tube tester comprising a plurality of test sockets associated with a main source of A.C. supply, with a plurality of single-pole, double-throw test switches preferably of the push-button type, and with a single selector switch for selecting the tests to be employed. The foregoing configuration is in turn associated with a single meter; and the several possible most likely faults occurring in a vacuum tube automatically cause this single meter to give a "bad" indication.

The tester itself is characterized by the fact that the several sockets are prewired to the aforementioned source of supply whereby filamentary voltages of appropriate range are automatically supplied to the several sockets so that a test of any of many vacuum tubes can be effected by merely selecting the appropriate socket for test purposes; and so that, as a matter of practice, a number of different tubes can in fact be tested in the same socket. The circuit, moreover, as mentioned previously, performs a tube worth test by determining the potential developed on a selected electrode of the tube, such as the tube control grid, due to the velocity of electrons emitted from the tube cathode; and inasmuch as the potential so developed on the selected electrode will be substantially the same for all tubes regardless of size, the determination of this developed potential due to electron velocity permits all tubes to be tested on the same meter range.

Finally, the tube worth tests performed by the circuit of the present invention are performed at an extremely low test voltage and with an extremely high impedance test circuit whereby substantially no plate current is drawn through a tube during the test thereof; and this characteristic of the tester permits the elimination of various voltage sources, loads, and control settings considered necessary heretofore.

Figure 2:
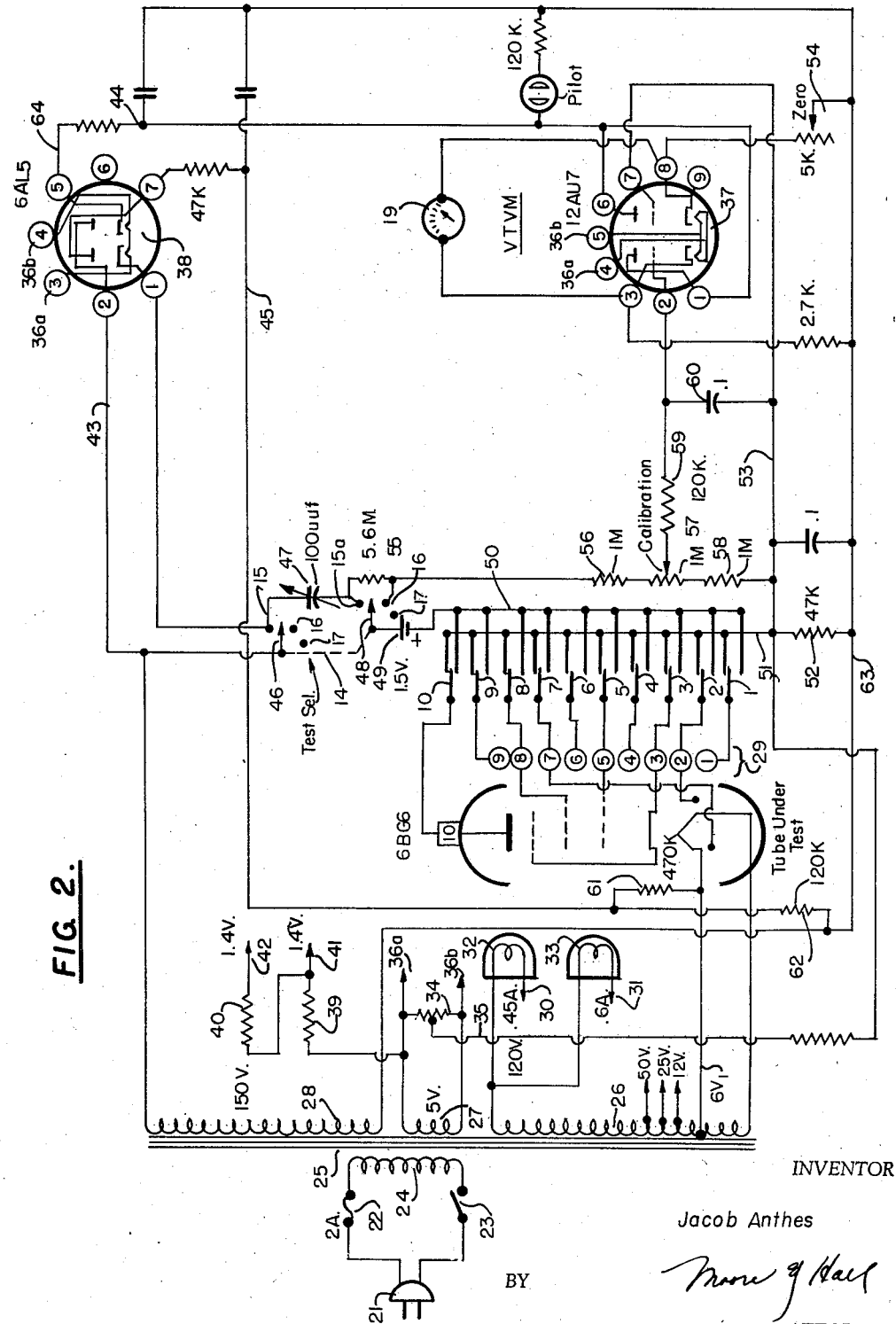

The foregoing objects, advantages, construction and operation of the present invention will become more readily apparent from the following description and accompanying drawings, in which:

Figure 1 is a plan view of a tube tester case constructed in accordance with the present invention; and Figure 2 is a schematic diagram of the improved tube tester incorporated in the case of Figure 1.

Referring now to Figure 1, it will be seen that in accordance with the present invention, a tube tester may comprise a case or housing 20 which is portable in nature; and the panel of the tester includes a number of pre-wired sockets adapted to receive various tubes to be tested. In the particular form of tester illustrated in Figure 1 and to be described subsequently in reference to Figure 2, a total of thirty-four pre-wired sockets are provided, which sockets are disposed, as illustrated in Figure 1, in a group 11 comprising sixteen sockets, a further group 12 comprising nine sockets, and a still further group 13 comprising nine more sockets.

The various sockets included in groups 11, 12 and 13 have different numbers and arrangements of terminals adapted to receive the base pins of any of the many conventional vacuum tubes ordinarily employed in electronic equipment; and in practice, the several individual sockets included in groups 11, 12 and 13 are identified by appropriate numerals placed on the tester panel itself, which numerals may be correlated with a master chart of tube types so that one may readily know which socket is to be employed for testing a specific tube. The portable tester 20 is in fact ordinarily associated with a cover, not shown, which carries such a chart on its inside surface; and this chart indicates not only the proper socket to be selected for the testing of any specific tube, but also indicates how the test is to be conducted, i.e. what button or buttons (to be described) should be depressed to perform the tube test.

The tester panel, in addition, includes a selector switch 14 having three positions 15, 16 and 17 corresponding respectively to a "shorts and gas leakage" test, to a "tube worth" test and to an "off" position; and the said selector switch 14 may be switched from position 17 to position 16 and thence to position 15 during the performance of the various tests to be described. The panel of tester 20 further includes a plurality of push-buttons designated 1 through 10 inclusive; and these push-buttons, as will be described in reference to Figure 2, comprise single-pole, double-throw switches which are interconnected to one another and to the correspondingly numbered terminals on each of the sockets in the groups numbered 11, 12 and 13 whereby the depression of a selected push-button will automatically complete a circuit to the corresponding socket terminal of the circuit selected for test purposes. The actual functioning of this portion of the circuit will become readily apparent from the subsequent description. The tester 20 further includes a clip 18 for making contact with a top cap in any tubes under test having such a cap; and the said tester further includes a single meter 19 adapted to indicate either "bad," "good," or an intermediate zone designated "?," thereby to indicate the merit of the tube under test.

The actual circuit configuration and operation of the improved tube tester comprising the present invention will become more readily apparent from an examination of the schematic shown in Figure 2. This particular schematic illustrates the interconnection of the various portions of the circuit with a single one of the thirty-four sockets included in groups 11, 12 and 13; but it will be understood from the subsequent description that the other thirty-three sockets are also wired to the filament supplies, to be described, and to the test switches 1 through 10, also to be described, in precisely the manner indicated in Figure 2. The overall circuit has not been shown in order to avoid undue complexity.

The particular circuit shown in Figure 2 includes a plug 21 adapted to be coupled to any appropriate source of alternating potential, such as a conventional house current supply, and the said plug 21 is coupled via a fuse 22 and a switch 23 to the primary winding 24 of a transformer 25. The switch 23 is in fact an on-off switch and may be coupled or otherwise interconnected to the test selector switch 14, and particularly to position 17 thereof, in order to permit the desired on-off operation of the tester. The transformer 25 includes three secondary windings which are designated respectively 26, 27 and 28. Transformer winding 26 has a number of taps thereon adapted to provide output potentials of 6 volts, 12 volts, 25 volts, 50 volts and 120 volts respectively; and each of these taps is prewired to one or more of the thirty-four sockets included in groups 11, 12 and 13, whereby each socket is supplied with a preselected heater energization. It will be appreciated, therefore, that selection of a single socket for test purposes automatically provides the necessary heater potentials for the tube to be tested in that socket; and no preliminary filament or heater voltage or current setup is required to effect a tube test.

In the particular example illustrated in Figure 2, the 6-volt tap on winding 26 is coupled to the heater terminals of an octal socket designated 29, and is, in particular, coupled to pins two and seven thereof. Accordingly, the socket illustratively indicated as 29 may be used for the testing of any 6-volt octal tube having heater pins two and seven. Similarly, the 6-volt tap on winding 26 as well as the other different voltage taps indicated thereon, are prewired to the heater pins on other of the sockets disposed in groups 11, 12 and 13, whereby a prewired heater socket is provided on the panel of the tester 20 for the test of any conventional tube known at the present time.

As will be noted from an examination of Figure 2, two further outputs are provided from secondary windings 26; and these are designated respectively as 30 and 31. The terminal 30 is taken from the 120-volt end of winding 26 through an incandescent lamp 32, and similarly the terminal 31 is taken from the 120-volt end of winding 26 through a further incandescent lamp 33. The two lamps 32 and 33 have differing wattage ratings; and by reason of their inclusion in the circuit, the said two lamps 32 and 33 act as automatically variable impedances designed to give a constant and predetermined output current rather than any specific voltage at points 30 and 31. In practice, the terminal or filamentary supply 30 provides a fixed current of 450 mils, while the terminal or filamentary supply 31 supplies a fixed current of 600 mils; and the said terminals 30 and 31 are coupled to preselected ones of the sockets in groups 11, 12 and 13 which are specifically adapted to test series string tubes at a rated current rather than at a rated voltage.

In this latter respect it should be noted that series string tubes, i.e. tubes wherein the filament or heater terminals are connected in series with one another in a more complex electronic circuit, normally operate at a rated current rather than at a rated voltage. In the actual operation of such series string tubes, for example in a conventional television set, individual defective ones of such tubes may tend to draw too much or too little current, or may tend to develop too much or too little heater voltage, whereby the overall string of tubes does not operate properly. Such a defect in an individual series string tube cannot be readily detected in testers of the types suggested heretofore, inasmuch as such testers seek to test the tubes by applying a rated voltage to the heater terminals thereof. As a matter of practice, it is entirely possible that application of a rated voltage to an individual series string tube may give an indication during the test that the tube is operating properly; and this erroneous test result arises directly by reason of the artificial condition imposed by the tester itself.

By testing series string tubes at a rated current, however, the test is conducted under precisely the conditions occurring when the tube being tested is connected in a series string; and any defect in the tube accordingly appears as a "bad" indication on the meter. The voltage actually developed across the filament of the tube, when the tube is placed in an appropriate socket coupled to one of the filament supply terminals 30 or 31, therefore corresponds to the voltage which will be developed across the series string tube filament under actual operating conditions and will correspond to the rated voltage for the tube only if the tube is otherwise operating properly. Moreover, it should be noted that through the use of a selected 450-mil or 600-mil current supply, all 450-mil or 600-mil series string tubes having the same base can be tested in the same socket regardless of whether the tube being tested has a voltage rating of one volt, two volts, three volts, four volts, five volts or seventeen volts; and the use of the incandescent lamps 32 and 33 directly and automatically assures that the proper voltage is applied without any change in filament setting. This feature for the improved testing of series string tubes at a rated current rather than at any artificial preselected voltage, assures a considerably more accurate test indication than has been possible heretofore.

The secondary winding 27 on transformer 25 is adapted to produce an output voltage of five volts across a resistance 34; and the center tap of said resistance 34, which comprises a virtual ground, is coupled to a line 35 which may be considered as a ground line in the overall circuit. In addition, ground line 35 is also coupled to a line 51 (to be described) which is associated with push-buttons 1 through 10 (also to be described); and this arrangement thus assures that each of the elements of a tube under test is maintained at substantially zero or ground potential until a selected button 1–10, associated with a selected tube element, is actually depressed. The opposing ends of the five-volt winding 27 are coupled to terminals designated 36a—36b and these terminals are utilized to supply filament energization at pins four and five of a 12AU7 tube 37 comprising a vacuum tube volt meter, to be described; and also supply filament energization at pins three and four of a type 6AL5 tube 38 acting as a power supply rectifier.

In addition, one end of the five-volt winding 27 is coupled via resistances 39 and 40 to 1.4-volt terminals 41 and 42; and the said terminals 41 and 42 are coupled to appropriate sockets in the groups 11, 12 and 13, which sockets are adapted to test direct-heated (or cathode-less) filamentary type tubes such as battery operated tubes. Accordingly, heater supplies are provided for the testing of both cathode type and cathode-less (or filamentary) type vacuum tubes; and it should be understood that the use of the term "cathode" in the subsequent description and appended claims is meant to include the electron source in both these types of tubes. It should moreover be noted in passing that the 1.4 filament voltage supply thus provided is taken from the winding 27 which is separate and distinct from windings 26 and 28, in order to provide isolation between the supplies employed in the testing of direct-heated and indirectly heated type tubes. If the 1.4-volt filament supply were taken from the winding 26 rather than from the winding 27, the test of cathode-less tubes would in fact give a "bad" indication every time on the meter 19, since absence of a cathode in such direct-heated tubes would show up in exactly the same manner as a filament-to-cathode short in an indirectly heated cathode type tube.

The secondary winding 28 produces a 150-volt output which is coupled via a line 43 to the plate of one section of the aforementioned 6AL5 rectifier tube 38, whereby said rectifier tube 38 produces a rectified positive potential at point 44, acting as the B+ supply for the aforementioned 12AU7 vacuum tube volt meter tube 37; and the said 6AL5 tube 38 further produces a rectified negative potential (e.g. approximately —60 volts) on line 45 which is employed for heater-to-cathode short testing, as will be described subsequently. The line 43 taken from secondary winding 28 is, in addition, coupled to one movable pole 46 of the two-pole test selector switch 14 whereby said secondary winding 28 may provide a 60-cycle AC voltage for leakage and gas tests, such as will also be described subsequently.

One switch position 15 of the test selector switch 14 is also coupled via leakage test capacitor 47 to a further terminal 15a; and the said further terminal 15a is adapted to selectively make with the second pole 48 of the aforementioned double-pole test selector switch 14. Pole 48 is in turn coupled via a standard 1.5-volt battery 49 to a test line 50 which is connected to the lower contact of each of the several single-pole double-throw test selector switches 1 through 10, already mentioned in reference to Figure 1. The movable pole of each of said test selector switches 1 through 10 (which may be of the push-button type), is coupled to the correspondingly numbered pin in each of the thirty-four sockets disposed in groups 11, 12 and 13, i.e. the center pole of push-button switch 1 is coupled to pin one in each of the thirty-four sockets; the center pole in switch 2 is coupled to the pin two in each of the thirty-four sockets, etc. Accordingly, depression of any one of the several push-button test switches 1 through 10 will supply a positive 1½-volt potential from battery 49 via line 50 and thence via the lower contact of the selected push-button switch to the correspondingly numbered pin of the selected socket. The function of this particular structure will become more readily apparent from the subsequent description as to test procedures and operation.

Each of the push-button type test selector switches 1 through 10 further includes a fixed upper contact which normally makes with the movable center pole thereof, and these upper contacts are coupled in parallel to a line 51 which, as mentioned previously, is connected to ground line 35. Accordingly, each of the elements of a tube under test is normally maintained at substantially ground potential until one of the buttons 1–10 is depressed, and the depression of a selected one of said buttons serves to alter the potential on a selected tube electrode from zero potential to +1.5 volts. In addition, line 51 is connected to a 47K resistor 52 as well as, via line 53, to the control grid of the righthand section (coupled to pin seven) of the vacuum tube volt meter tube 37. This righthand section of tube 37 is in fact a zero-set section, and the cathode of said righthand section is coupled to a calibration control 54 whereby the meter 19 can be set to zero under no-signal conditions.

As has been mentioned previously, the test circuit provided in the present invention is of very high impedance as contrasted to the low impedance test circuits utilized heretofore. In particular, the test circuit includes a 5.6 megohm resistor 55 which is coupled between selector switch terminals 15a and 16, and three series-connected one megohm resistors 56, 57 and 58, which are coupled between terminal 16 and line 53. When switch 48 is therefore in contact with terminal 15a, a load of 8.6 megohms is placed across the tube; and when the switch 48 is in contact with position 16, a load of 3 megohms is placed across the tube. Each of these loads is so high that during the test of the tube substantially no plate current can be drawn whereby the several advantages already discussed can be achieved.

The resistor 57 is in fact a potentiometer which may be coupled via a filter network comprising resistance 59 and capacitor 60 to the control grid of the lefthand section of the vacuum tube volt meter tube 37. As will be described subsequently, the potentiometer 57 may be adjusted to recalibrate the vacuum tube volt meter when aging of the 12AU7 tube occurs; and the voltage coupled from resistor 57 via RC network 59—60 to the vacuum tube volt meter in fact comprises a voltage corresponding to the contact potential developed on a tube under test.

The overall arrangement thus described will be most readily appreciated by examining the test procedures and results achieved during the test of a typical vacuum tube. In the particular circuit shown in Figure 2, the tube under test has been designated as a 6BG6, and such a tube would normally be placed in the appropriate socket employed for the test of this tube, whereby a 6-volt filamentary potential is automatically supplied to the filament of the test tube at pins two and seven thereof, and whereby the other pins of the test tube are automatically connected to the center pole of the several push-button switches of corresponding number. Inasmuch as the 6BG6 tube has a top cap, the clip 18 is attached to said cap and this cap 18 is in turn connected to the center pole of push-button switch 10, as indicated in Figure 2.

The first test which can be performed comprises a test for gas and interelectrode leakage as well as a test for cathode-to-heater shorts. The cathode-to-heater short test may in fact be considered to comprise a special case of the leakage test; and such a short test occurs automatically when the tube is plugged into its appropriate socket. In particular, it will be noted that the filament of the tube under test is prewired to a 470K resistor 61, the upper end of which is coupled to line 45 carrying the aforementioned —60 volts produced by the rectifier tube 38. Line 45 is also coupled via 120K resistor 62 to a line 63 which is connected to the lower end of resistor 52. In the absence of a short between the heater and cathode of the tube being tested, therefore, a predetermined fixed voltage will be developed across resistor 52 and this voltage is coupled via line 53 to the control grid of the righthand section of the vacuum tube volt meter tube 37. So long as no heater-to-cathode shorts occur, therefore, there will be isolation between the cathode and heater of the tube under test, whereby the righthand section of the tube 37 will produce a balancing current output determined by the setting of control 54; and further tests may be undertaken without this situation being disturbed.

If, however, a cathode-to-heater short does occur, a negative voltage is fed from line 45 through resistor 61 to the heater of the tube under test and is then fed via the shorted cathode, and thence via push-button switch 3 and line 51 to line 53, and thence to the grid of the righthand section of tube 37. Since the cathode pushbutton switch 3 need never be depressed during a test procedure (only the grid, or grid and plate buttons are depressed, as will be described), the circuit path so specified for the short test voltage will always be present. The negative voltage thus fed to the righthand section of the vacuum tube volt meter will cause the meter 19 to read low or zero; and as a result, once the tube under test is plugged into its appropriate socket, the vacuum tube volt meter 19 will continue to read low or "bad" if the tube is shorted regardless of whatever other tests are attempted.

It should be noted that the short test so accomplished is effected by coupling a negative voltage via the resistor 61 and thence via the shorted elements of the tube to the righthand section of the vacuum tube volt meter tube 37. Various modifications can be effected, however, without altering the ultimate result achieved. By way of example, it should be noted that the upper end of resistor 61, rather than being coupled to the negative line 45, can be coupled to a positive voltage such as that produced at point 64 comprising pin five of the 6AL5 rectifier tube 38. When this alternative connection is employed, a positive voltage will be supplied from rectifier 38 via resistor 61 to the heater of the tube under test; and a heater-to-cathode short in such a tube under test will therefore raise the cathode of the tube to a high positive potential. As a result of this high positive potential on the cathode of the tube under test, the tube being tested will be completely cut off; and no electron emission will occur from the cathode thereof whereby no voltage could possibly be applied to the control grid of the lefthand section of tube 37 during subsequent tests of the tube under test.

The actual circuit operation effected by these two alternative connections of resistor 61, therefore, differ in that the supplying of a negative potential via resistor 61 causes the righthand section of tube 37 to cut off when shorts are present; while the coupling of a positive potential via resistor 61 causes the lefthand section of tube 37 to cut off when shorts are present. However, in either event, the indication on meter 19 will be the same in that the meter will read low or zero thereby indicating that the tube is bad.

The next test which can be conducted is a test of gas leakage or interelectrode leakage in the tube. In order that this test can be performed, the double-pole switch 14 is placed in its uppermost position whereby the movable switch poles 46—48 make with terminals 15 and 15a. When test selector switch 14 is placed in this position, a 60-cycle voltage is fed from the upper end of winding 28 through switch blade 46 to terminal 15 and thence via capacitor 47 and elements 15a, 48, 49 and 50, to each of the lower contacts of the several push-button switches 1 through 10. The 60-cycle test voltage from winding 28 is also coupled via the aforementioned capacitor to the high impedance test circuit (8.6 megohms) comprising elements 55–58, inclusive, connected in series; and the energized test circuit 55–58 will, upon depression of one or more of push-buttons 1–10, thereby be shunted by an energized portion of the tube under test.

In order to perform the leakage test (as well as the tube worth tests to be described), it is merely necessary that the push-button associated with the control grid of the tube under test be depressed. As a practical matter, the depression of such a single push-button associated with the control grid of the tube under test will suffice to give a test for all grid controlled tubes; but the single button test is particularly useful in the case of triodes. It has been found that a more efficient test is accomplished in the case of pentodes by depressing both the grid and plate push-buttons, since the simultaneous depression of both these buttons permits for testing of grid-to-plate, screen grid-to-plate, control grid-to-screen grid, and control grid-to-cathode leakages, in such multiple grid tubes.

Accordingly, in order to test the 6BG6 tube indicated in Figure 2, it is merely necessary that the push-button 5 be depressed; or that in the alternative, both of push-buttons 5 and 10 be depressed; and the actual push-buttons which should be depressed for the test of any given tube will, as mentioned previously, be indicated in the master chart accompanying the overall test equipment. When push-button 5 is depressed, with selector switch 46 in its uppermost position (i.e. during a leakage test), the aforementioned 60-cycle voltage appearing on line 50 is coupled via push-button 5 to the control grid of the tube under test. At the same time, the aforementioned test circuit impedance of 8.6 megohms, comprising resistors 55 through 58 in series, is connected across the tube and particularly across the grid-cathode circuit of the said tube (or across the grid-cathode and plate-cathode circuits, if push-button 10 is also depressed). The 60-cycle voltage applied to the control grid of the tube, upon depression of switch 5, causes grid rectification to occur in the tube under test thereby placing an impedance corresponding to the interelectrode impedance of the tube being tested across the aforementioned 8.6 megohm load.

Any interelectrode leakage in the tube will cause the tube to conduct on alternate half-cycles of the applied 60-cycle voltage, and any gas present in the tube will in fact cause the tube to conduct on both half-cycles of the applied 60-cycle voltage. If there is substantially no gas or interelectrode leakage in the tube, there will be substantially no change in voltage across the 8.6 megohm load (particularly across resistor 57 thereof), and the meter 19 will read high or "good." A test tube leakage as high as 10 megohms will so alter the effective impedance of the test circuit, and will so alter the potential coupled to the lefthand grid of tube 37 that a substantial reduction in the reading of meter 19 will occur. If the leakage in the tube causes the tube to present an impedance of approximately 8.6 megohms, the meter reading will fall to about one-half, whereby the meter will indicate in the "?" range. A test tube interelectrode leakage of 5.6 megohms or less will so lower the voltage coupled to the lefthand section of vacuum tube volt meter tube 37 that the meter will read "bad."

Thus, the depression of one or at most two push-buttons permits an extremely sensitive determination of gas leakages and interelectrode leakages to be effected (far more sensitive than has been possible heretofore); and this indication is produced on precisely the same meter 19 as was previously employed to indicate heater-to-cathode shorts. Indeed, such heater-to-cathode shorts could be considered to comprise a special case of the aforementioned leakages in the tube.

In order to test the tube worth of the tube under test, the test selector switch is moved to its second position wherein the movable poles 46 and 48 of selector switch 14 make with contacts 16. In this second position of the switch 14, it will be noted that the aforementioned 60-cycle voltage is not fed via leakage capacitor 47 to any of the electrodes of the tube; and the sole source of supply coupled to line 50 comprises the 1.5 volt standard battery 49. The worth test performed by the circuit of the present invention determines tube worth as well as the effectiveness of cathode emission, by checking the potential developed on the control grid of the tube under test due to the velocity of electrons emitted from the cathode of said tube. If the cathode of the tube under test is not faulty, it will emit electrons due to the heating thereof toward the tube control grid, and these electrons will in turn cause a negative voltage to be developed, on said tube grid, which is directly related to the velocity of electrons so emitted from the cathode. It should be noted that the voltage so developed on the control grid of the tube depends solely upon the velocity of the electrons emitted from the cathode, and is not dependent upon the size of the tube being tested. Accordingly, substantially the same voltage will be developed upon the control grid of the tube regardless of the voltage rating of the tube, so long as the tube cathode is not faulty.

In order to permit the vacuum tube volt meter 19 to be properly calibrated for tube worth evaluation (as will be discussed subsequently), and to accelerate the electrons emitted from the cathode under test toward the control grid of said tube under test, the aforementioned 1.5-volt battery 49 is supplied to impress a very small positive potential on the control grid of the tube under test. This voltage is sufficiently small that the tube worth test is not affected thereby, i.e. a faulty tube will not read "good" due to the increased velocity of electrons resulting from the positive potential impressed on the control grid of the tube under test.

In actual operation, for this tube worth test, the push-button associated with the control grid of the tube under test is again depressed (i.e. push-button 5 would be depressed for the test of the 6BG6 tube indicated in Figure 2). A small 1.5-volt potential is therefore supplied to the control grid of the tube under test at an impedance of 3 megohms (resistances 56 through 58 in series); and the voltage appearing on the control grid of the tube under test, due to the velocity of electrons emitted by the cathode of the tube under test toward the control grid thereof, is accordingly developed across resistors 56 through 58 whereby a further voltage, related to this developed voltage, is derived from resistor 57 and is coupled via RC filter 59—60 to the control grid of the left-hand section of tube 37. If the voltage so coupled to vacuum tube volt meter tube 37 is high, indicating that the cathode of the tube under test is emitting properly or to a sufficient extent, the meter 19 will similarly read high. On the other hand, if, due to faulty emission or other defects in the cathode of the tube under test, little or no voltage is coupled from resistor 57 to the vacuum tube volt meter tube 37, the meter 19 will read low or "bad."

It should particularly be noted that the tube worth test so conducted is conducted at a very low test potential, i.e. a voltage not in excess of 2 volts, and is conducted in conjunction with a very high impedance test circuit, i.e. 3 megohms. As a result, substantially no current is drawn through the tube or via the test circuit during the tube worth test; and therefore the voltage coupled to vacuum tube volt meter tube 37 has no tendency to fall off due to current flow during the test. This situation is directly contrary to testers suggested heretofore, wherein high test voltages and low impedance test circuits are ordinarily employed.

The 1.5-volt battery 49 may, in addition to being employed in conjunction with the gas and inter-element leakage, short and tube worth tests, be utilized for calibration of the vacuum tube volt meter in order to permit an accurate tube worth test to be conducted. The battery 49, as thus employed, is adapted to check for aging of the 12AU7 tube 37 after the tester has been in operation for some time, which aging might otherwise impair the accuracy of the tube worth test. In order to permit this particular meter calibration, the push-button switch 10 should be so constructed that when the movable contact thereof is depressed half-way, the bottom fixed contact thereof makes with said movable contact before the top contact breaks. When so constructed, therefore, a partial or half-way depression of switch 10 will cause the upper and lower contacts thereof to be electrically connected together whereby the 1.5-volt battery 49 is coupled directly across the 3 megohm test circuit comprising resistors 56 through 58 in series. As a result, the same standard voltage of 1.5 volts which is employed in the tube worth test, is impressed upon the vacuum tube volt meter tube 37 via potentiometer 57 and filter network 59—60, and the potentiometer 57 may thereupon be adjusted appropriately to so calibrate the vacuum tube volt meter that actual tube emission, and resulting worth of a tube being tested with said 1.5 volt supply, can be determined notwithstanding aging of the 12AU7 tube 37. It will be appreciated that this particular meter calibration and adjustment is effected prior to initial use of the equipment; and recalibration to compensate for tube aging thereafter need be conducted only at relatively wide intervals and can be conducted by a serviceman.

Summarizing, therefore, it should be noted that the meter 19 is employed for checking shorts, gas and interelectrode leakages, tube worth and meter calibration; and the use of this common meter for all these purposes eliminates auxiliary indicating equipment, such as glow lamps and the like, considered necessary heretofore. Moreover, the tests are conducted at a very low test voltage (less than 2 volts) in conjunction with a very high impedance test circuit (8.6 or 3 megohms), whereby no load control is necessary and no plate current is drawn during the test. These features, as well as the fact that the same potential is developed by electron emission on the control grid of various tubes under test regardless of their size, permits widely varying tubes to be tested in the same socket, in a most simple manner without any necessity for elaborate test setups. Moreover, the overall circuit is such that mere selection of an appropriate socket for test purposes automatically supplies substantially all necessary potentials required during the test; and the test circuit is indeed finally and completely set up upon depression of one and no more than two push-buttons. This particular characteristic of the circuit and test procedures makes the overall tester of special value when extremely rapid checks, adapted to detect the most likely faults in a vacuum tube, are desired, as well as when tube testing is to be conducted by a layman. Finally, the tests performed are, notwithstanding the simplicity of test procedures and test circuit, extremely sensitive, accurate and reliable; and in the case of series string tubes, are in fact far more reliable than anything possible heretofore.

While I have thus described a preferred embodiment of my invention, many variations will be suggested to those skilled in the art, and it must therefore be stressed that the foregoing description is meant to be illustrative only and should not be considered limitative of my invention. All such modifications and variations as are in accord with the principles described are meant to fall within the scope of the appended claims.

Having thus described my invention, I claim:

1. In a tester for testing grid controlled vacuum tubes, the combination which comprises a multi-terminal socket adapted to receive a tube to be tested, means coupled to selected terminals of said socket for heating the cathode of a tube under test, means for applying a relatively low positive D.C. potential having a magnitude no greater than two volts to the control grid of said tube under test whereby said control grid drops to a negative potential corresponding to the velocity of electrons emitted by said heated cathode, a high impedance circuit coupled to said tube whereby said high impedance circuit develops a potential related to said control grid potential without drawing appreciable current through said tube under test, and means coupled to said high impedance circuit for indicating the magnitude of said related potential thereby to indicate the worth of said tube under test.

2. The combination of claim 1 wherein said tube under test includes a filamentary type heater electrode, said means for heating the cathode of said tube comprising a source of energization, and an automatically variable impedance between said source and said heater electrode whereby said heater electrode draws a preselected substantially constant current.

3. The combination of claim 2 wherein said automatically variable impedance comprises an incandescent lamp connected in series with said heater electrode.

4. The combination of claim 1 wherein said means for applying said low positive D.C. potential comprises a D.C. source, and switch means between said source and said control grid.

5. The combination of claim 4 including a source of A.C. potential, and selector switch means between said A.C. source and said D.C. source whereby D.C. alone may be applied to said control grid to test for tube worth, and whereby both A.C. and D.C. may be applied to said control grid to test for gas and interelectrode leakages.

6. In a tube tester, a plurality of multi-terminal sockets adapted respectively to receive tubes to be tested, an energizing source for producing a plurality of different A.C. potentials, wiring means coupling said plurality of different A.C. potentials to selected terminals of different ones of said sockets, respectively, which selected terminals correspond in each of said sockets to the heater electrode terminals of preselected tubes to be tested in said socket, whereby said selected terminals in each of said sockets are prewired to an A.C. heater potential corresponding to the rated heater potential of tubes to be tested in said sockets, a plurality of push-button test switches interconnected to one another and coupled respectively to the other terminals in each of said sockets, a relatively high impedance circuit having a magnitude of at least three megohms, said high impedance circuit being coupled to said interconnected switches whereby depression of any one or more of said switches during test of a tube in a selected one of said sockets will not effect appreciable current flow via said depressed switch through said tube under test, and meter means coupled to said high impedance circuit for determining the magnitude of potential developed in said high impedance circuit upon depression of at least one of said switches during said tube test.

7. The combination of claim 6 including incandescent lamp means coupling selected ones of said A.C. potentials to the heater electrode terminals of preselected ones of said sockets whereby said preselected sockets have their heater terminals energized at a fixed current for the test of series-string tubes.

8. In a tube tester for testing the worth of a tube having a cathode and at least one other element, means for heating said cathode, means for applying a positive D.C. potential, having a magnitude no greater than two volts, to said other element whereby said cathode emits electrons toward said other element, said other element thereby developing a negative potential related to the velocity of electrons emitted by said cathode, and a high impedance test circuit coupled to said other element for determining the magnitude of said negative potential without drawing appreciable current through said tube.

9. The combination of claim 8 wherein said positive potential applying means comprises a low-voltage battery, and push-button means for completing a circuit between said battery and said other element.

10. The combination of claim 8 wherein said high impedance test circuit includes a meter for indicating the magnitude of said negative potential thereby to determine tube worth, said tube including a filamentary-type heater, said means for heating said cathode comprising a source of A.C. potential coupled to said heater, means coupling a D.C. potential to said heater, and means coupling said cathode to said meter whereby said meter also responds to appearance of said D.C. potential on said cathode thereby to indicate a heater-to-cathode short-circuit in said tube.

11. The combination of claim 8 wherein said other element comprises a control grid in said tube, a source of A.C. potential, selector switch means between said source and said element for selectively applying said A.C. potential to said control grid and to said high impedance test circuit, said high impedance test circuit being disposed substantially in parallel with said tube being tested whereby a voltage is developed in said test circuit the magnitude of which is related to the gas and inter-element leakage impedance of said tube, and meter means responsive to said last-named voltage for indicating the presence and magnitude of gas and inter-element leakage in said tube.

12. In a tube tester for testing vacuum tubes, a multi-terminal socket adapted to receive a grid-controlled tube to be tested, means coupled to said socket for heating the cathode of a tube being tested therein, a high impedance test circuit, first switch means coupled to said socket for selectively completing a circuit between the said high impedance test circuit and the control grid of said tube being tested whereby said control grid couples a potential to said test circuit characteristic of the emission of said cathode, a source of A.C. test potential, second switch means for selectively coupling said A.C. source to said first switch means whereby an A.C. potential may be selectively coupled to said control grid of said tube being tested via said first and second switch means thereby to determine the gas and inter-element leakage in said tube, and a meter coupled to said high impedance test circuit and responsive to potentials produced in said test circuit whereby said meter indicates both the cathode emission and the leakage of said tube being tested.

13. The combination of claim 12 wherein said tube being tested includes a filamentary type heater and an indirectly heated cathode, means coupling a further test potential to one of said heater and cathode elements, and means coupling the other of said heater and cathode elements to said meter whereby said meter also indicates a heater-to-cathode short-circuit in said tube in response to appearance of said further test potential on said other element of said tube being tested.

14. In a tube tester for testing the worth of a tube having a cathode and at least one other element, means for heating said cathode, a source of standard D.C. potential, first means for applying said standard D.C. potential source to said other element whereby said cathode emits electrons toward said other element thereby to produce a negative potential on said other element related to the velocity of said emitted electrons as determined by said standard potential, a voltmeter circuit coupled to said tube for determining the magnitude of the negative potential produced on said other element, and second means for applying said standard source to said voltmeter circuit independently of the application of said source to said other element thereby to permit said voltmeter circuit to be calibrated for tube worth with the same standard source utilized in said tube worth test.

15. In a tube tester, a test socket having a plurality of terminals, a tube to be tested disposed in said socket, a plurality of push-button switches connected to said terminals respectively, a standard source of relatively low D.C. potential coupled in common to said push-button switches whereby actuation of a selected one of said switches couples said standard source to the socket terminal connected to said selected switch, a relatively high impedance circuit coupled to said test socket, said high impedance circuit including a variable impedance, a vacuum tube voltmeter circuit coupled to said variable impedance in said high impedance circuit for indicating the potential developed in at least a portion of said high impedance circuit upon actuation of said selected switch thereby to indicate the worth of said tube under test, and means for coupling said standard source to said high impedance circuit whereby said voltmeter circuit may be calibrated for operation in said tube worth test with said standard source by variation of said variable impedance.

References Cited in the file of this patent

UNITED STATES PATENTS

| | | |
|---|---|---|
| 2,133,610 | Fausett | Oct. 18, 1938 |
| 2,492,733 | Burchell | Dec. 27, 1949 |
| 2,699,528 | Periale | Jan. 11, 1955 |
| 2,749,511 | Canning | Jan. 5, 1956 |
| 2,784,371 | Stock | Mar. 5, 1957 |
| 2,787,761 | Berlin et al. | Apr. 2, 1957 |
| 2,795,755 | Anthes | June 11, 1957 |

OTHER REFERENCES

Podbielniak, Abstract of Appl. No. 111,922, vol. 650, pp. 599–600 O.G., September 11, 1951.